United States Patent
Merabet

[11] Patent Number: 5,891,490
[45] Date of Patent: Apr. 6, 1999

[54] EDIBLE MICRO-EMULSION AND METHOD OF PREPARING A FOOD PRODUCT TREATED WITH THE MICRO-EMULSION

[75] Inventor: Mustapha Merabet, Montreux, Switzerland

[73] Assignee: Nestec S.A., Vevey, Switzerland

[21] Appl. No.: 924,645

[22] Filed: Sep. 5, 1997

[30] Foreign Application Priority Data

Sep. 16, 1996 [EP] European Pat. Off. ............... 96202587

[51] Int. Cl.⁶ .................................................. A23B 7/005
[52] U.S. Cl. ........................... 426/302; 426/94; 426/241; 426/243; 426/304; 426/602; 426/604
[58] Field of Search ............................. 426/94, 241, 243, 426/302, 304, 602, 604

[56] References Cited

U.S. PATENT DOCUMENTS

| | | | |
|---|---|---|---|
| 5,043,173 | 8/1991 | Steinke et al. ........................... | 426/94 |
| 5,160,759 | 11/1992 | Nomura et al. ........................... | 426/602 |
| 5,376,397 | 12/1994 | Gaonkar ................................... | 426/602 |
| 5,466,478 | 11/1995 | Brockhus et al. ........................ | 426/602 |
| 5,514,670 | 5/1996 | Friedman et al. ......................... | 514/2 |

FOREIGN PATENT DOCUMENTS

93/15736  8/1993  WIPO .

OTHER PUBLICATIONS

M. Formo et al., "Bailey's Industrial Oil and Fat Products", vol. 1 (1979), Wiley–Interscience, USA, pp. 185–186.

Primary Examiner—Helen Pratt
Attorney, Agent, or Firm—Pennie & Edmonds LLP

[57] ABSTRACT

The present invention relates to an edible oil-in-water micro-emulsion for imparting crisping and browning to a food product when the micro-emulsion is coated onto the food product and the coated food product is then subjected to microwave radiation.

25 Claims, 5 Drawing Sheets

EDIBLE MICRO-EMULSION AND METHOD OF PREPARING A FOOD PRODUCT TREATED WITH THE MICRO-EMULSION

TECHNICAL FIELD

The present invention relates to the use of an edible oil-in-water micro-emulsion for crisping and browning of a food product which is subjected to microwave radiation. The invention also relates to the use of such an edible oil-in-water micro-emulsion and a process for preparing such a food product treated with the micro-emulsion.

BACKGROUND ART

One serious problem in the microwave re-heating of food products is the lack of crispness and browning of products which are reheated in that manner. Browning and crisping are particularly desirable when heating, bread, batter-based baked products or battered food products such as battered fish or meat. The problem with this lack of crispness and browning is directly related to the temperature which can be obtained on the surface of the product during microwave heating and to the moisture transfer within the product. The surface temperature will depend on number of factors.

Firstly, the air in the microwave oven is not heated, and is at a temperature which is slightly higher than ambient. When the product heats up, water vapor is driven out of the product. As the product surface is at or near ambient temperature, the water vapor will condense upon it and moisten it. In order to dry out the surface of the product, more microwave heating is necessary which will result in an over heating if not a burning of the core of the product.

Secondly, the microwave focusing effect due to the microwave penetration depth and the size of the product generates hot spots in the interior of the product heated in such ovens. The resulting temperature gradients which drive the moisture from the hot spot i.e. from the interior to the exterior, are thus inverse to what is required to dry out the surface.

A conventional way to solve the problem of lack of crisping and browning is to use what is known as susceptors. A susceptor is a device which comprises material that, when subjected to microwaves, absorbs energy and is heated to 200° C. to 450° C. (400° F. to 800° F.) Traditionally, the susceptor is positioned beneath and in close contact with the product to be heated and provides, by conduction or radiation, a crisping or browning of the product surface. A susceptor may e.g. be a plastic or paper substrate in which a thin layer of metal particles is deposited. Use of susceptors is however for many purposes undesirable, for example, it only allows surfaces directly adjacent to the susceptor to be crisped or browned. Also, the use of susceptors introduces a risk of migration of volatile gases into the food product, and it adds to the cost of the product.

Alternative microwave browning technology relates to emulsions which are added onto the product prior to it being microwave heated, and which e.g. are based on Maillard reactions or agents that change color when heated. Although such browning agents may be suitable for the browning of a product, they do not add to the crispness as they do not substantially change the micro-wave heating regime. Browning agents of this type in the prior art are emulsions and have a dispersed phase with droplet of e.g. 0.1 mm.

SUMMARY OF THE INVENTION

According to the invention it has surprisingly been found that if an oil-in-water micro-emulsion is coated onto a food product, the heating of the product in a micro-wave oven substantially changes. It has been found that by coating the food product with a micro-emulsion, more micro-wave energy is absorbed at the surface of the food product and the micro-wave penetration depth is decreased. This allows a crisping and browning of the food product. A micro-emulsion has droplet size in the range of 0.01 to 0.5 μm.

The formation of micro-emulsions of the oil-in-water type with surfactant unacceptable in the food domain is well known e.g. water/triglyceride/R12E04 (Tetraethylene Glycol Dodecyl Ether). An edible micro-emulsion is known from the prior art U.S. Pat. No. 5,376,397 to form a micro-emulsion with a short chain alcohol such as ethanol, propanol and propylene glycol. An alcohol of this type is however undesirable in many types of foods. Nevertheless, the ability of this prior art micro-emulsions to act as microwave "susceptors" remains unproved, the patent does not mention such qualities.

With the micro-emulsion coatings according to the invention, the pattern of microwave interaction with the products substantially changes. The micro-emulsion can be formulated so that it only comprises components which are allowed in the food domain. By using the edible micro-emulsion of the invention the heating of a food product can be carried out while the following may be obtained Avoiding microwave focusing effects in the product.

Controlling the temperature of the interior of the product through controlling the dielectric properties of the micro-emulsion.

Reducing the microwave penetration into the product and heating to a higher temperature a thin layer just beneath the surface of the product.

Drying and even browning the surface while the interior of the product is maintained below 100° C.

Consequently, with the present invention one may obtain a microwave heated product which has a crisp and also a darkened surface by slightly extending the heating time, and where the interior of the product is not excessively dried. The product may e.g. be heated from either the frozen, refrigerated or ambient state.

Further aims of the invention are:

a micro-emulsion with the above characteristics which in terms of induced taste and released flavor is "neutral".

a micro-emulsion free of short chain alcohols such as ethanol, propanol and propylene glycol.

BRIEF DESCRIPTION OF THE DRAWINGS

The invention will now be illustrated in further details with reference drawings and examples, by way of examples only, wherein.

Figure 1:
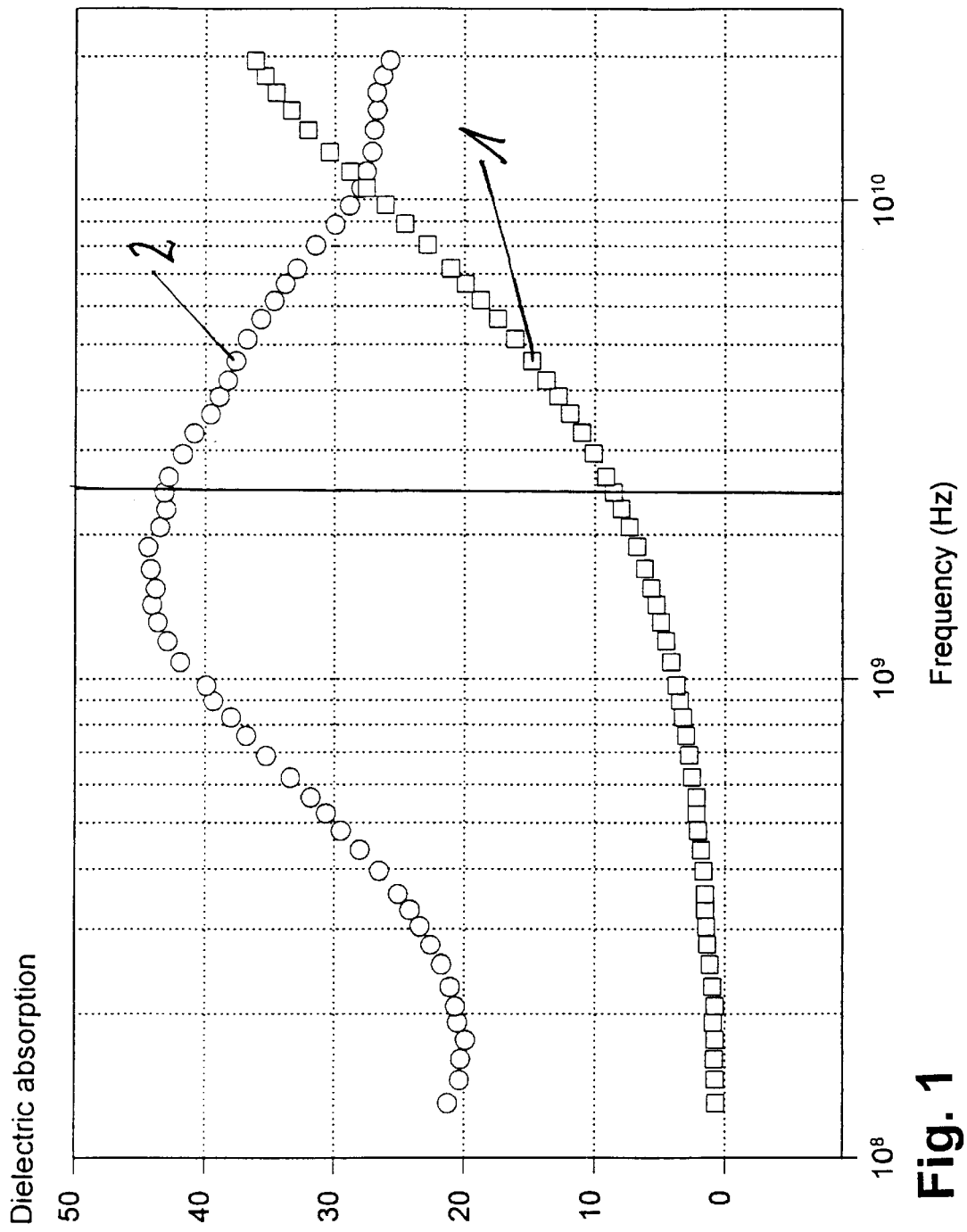
FIG. 1 is a diagram showing the dielectric absorption of the edible susceptor comprising polysorbat 20 compared with the absorption of water.

In the first aspect, the invention relates to the use of an edible oil-in-water micro-emulsion as a coating on a food product for the crisping or browning of the food product when subjected to microwave radiation.

In the present context a micro-emulsion is a substantially thermodynamically stable dispersion of at least two immiscible liquids (or phases) containing an appropriate amount of surface active agents (i.e., surfactants and co-surfactants). When put together, the two immiscible liquids separate rapidly. The addition of surfactants in appropriate amounts, and if necessary also co-surfactants, would lead to the formation of interfacial layers between the two phases, thus lowering the interfacial tension between the two phases down to about zero, which is the condition required for coexistence at equilibrium of the two phases. The dispersed phase is characterised by a droplet size in the range of 0.01 to 0.5 $\mu$m.

The micro-emulsion according to the invention is an oil-in-water micro-emulsion i.e. a dispersion of oil droplets in an aqueous phase.

It has been found that an oil-in-water micro-emulsion has microwave absorption characteristics which make it highly suitable as a crisping and browning agent, when added onto the surface of a food product. The micro-emulsion of the invention absorbs microwave energy in a thin layer at the surface of the food product and thus heats the dispersed oil droplets up to about 200° C. or more while the water continuous phase quickly evaporates. In order to accomplish this, the micro-emulsion has both high dielectric absorption $\epsilon"$ and the real part $\epsilon'$ of the dielectric permittivity when compared to that of water at the microwave heating frequency of 2.45 Ghz. This characteristic gives a high microwave heating rate and a small microwave penetration depth $\delta$.

The microwave penetration depth $\delta$ may be given for a frequency f by:

$$\delta = \frac{1}{2\pi f} * 1/[(\frac{1}{2} * ((\epsilon')^2 + (\epsilon")^2)^{1/2} - \epsilon'))^{1/2}]$$

According to the invention it has been found that it is desirable to have a dielectric absorption of about 30 and a real part of the permittivity which is higher than 60. The size of the dispersed droplet in the micro-emulsion was found to be suitable for obtaining the dielectric properties for this oil-composition range.

The present invention relates also to an edible oil-in-water micro-emulsion which is particularly suitable for the crisping and browning of a food product when subjected to microwave radiation comprising the following components:

(a) at least 80% water by weight, (b) up to 10% oil by weight having an interfacial tension against water below 0.10 N/m, and (c) at least one non-ionic hydrophilic surfactant.

In order to obtain a stable micro-emulsion using surface active agents allowed in food it has been found that it is necessary for the oil in the oil-in-water micro-emulsion to have a low interfacial tension against water that is below 0.1, preferably below 0.03 N/m. Advantageously, the interfacial tension against water is below 0.0250 N/m, preferably in the range of 0.0230 to 0.006 N/m, more preferably in the range of 0.019 to 0.006 N/m, most preferably about 0.0185 N/m.

The oil may have a viscosity ranging from 20 to 45 mPa.s., preferably from 27 to 35 mPa.s. Oils such as vegetable oils have been found less attractive as they leave a pronounced oily touch on the product onto which they have been sprayed. The viscosity of vegetable oil is generally higher than the above referenced oil, e.g. >90 mPa.s. for olive oil.

The oil is preferably a medium-chain triglyceride having C6–C18 fatty acids. Advantageously, the triglyceride has C8–C12 fatty acids, preferably C8–C10 fatty acids. One particularly suitable oil is triglyceride oil of fractionated C8–C10 coconut fatty acids. Another suitable oil is a medium-chain-triglyceride composed of about 60% of C8 and about 40% of C10.

Suitable results have been obtained with an oil comprising a medium-chain triglyceride and an edible organic acid in an amount of 10% or less. When 5% linoleic acid is added, surprisingly good results are achieved. It is believed that due to the two polar heads of the linoleic acid the polarity of the molecules of the oil is increased allowing a better compatibility of such oil with the aliphatic chains of the surfactant. See example below wherein medium-chain triglyceride of only C8 and C10 coconut fatty acids are present.

Suitable commercially available oils are oils from the Miglyol® series from Hüls Aktiegesellschaft, Germany, and Delios® from Chemishe Fabric Grünau, Germany. For example, Miglyol® oils are available having an interfacial tension against water of 0.0185 N/m.

The micro-emulsion comprises from at least 80% of water by weight, preferably between 80 and 92%, and up to 10% of oil by weight, preferably from 2 to 10%, oil, which has the advantage that the coating and heating of a food product does not leave a surface having an oily appearance such as the case may be for products treated with emulsions having less water but a higher oil content than that of the micro-emulsion according to the invention. A higher oil content makes it difficult to form an oil-in-water micro-emulsion, i.e. an emulsion with a droplet size of below 0.5 $\mu$m.

The micro-emulsion according to the invention comprises at least one non-ionic hydrophilic surfactant. Surfactants enhance the micro-emulsification of the oil droplets in water, through the formation of interfacial layers between the two phases. This is necessary in order to form a micro-emulsion. The surfactant(s) reduce(s) the interfacial tension between water and oil, preferably to about zero. The surfactant used in the micro-emulsion according to the invention is one that is of food-grade or is allowed for use as food additive.

In accordance with the invention the micro-emulsion comprises at least one surfactant which is water soluble and which has a hydrophile-Lipophile balance (HLB) which is in the range of 8 to 18. The HLB number refers to the surfactant's affinity with water or with oil. A high HLB with a maximum of 18, refers to the surfactant which is highly hydrophilic, and decreasing HLB numbers (minimum of 1.0) correspond to decreasing hydrophilicity which means a better association with oil. The HLB may be determined by conventional procedures e.g. titration in benzene and dioxane.

It is preferred that the surfactant be selected from the group consisting of polysorbates and sorbitans. Particularly advantageous is a polysorbate which is selected from the group consisting of polysorbate 20, polysorbate 65 and polysorbate 80 or a combination thereof, while the sorbitan is advantageously selected from the group consisting of sorbitan 20 and sorbitan 80.

The polysorbates used are considered as direct food additives with a relatively high maximum level. For example, 10 g/kg of the final product for baking purposes European Union (EU) Standard. The value level allowed is not reached in our application of micro-emulsion. Polysorbate 20, 80 and to a lesser extent 65 are water soluble.

Hydrophile-Lipophile Balance (HLB) number for polysorbate 20, 80 and 65 are 16.7, 15.0, and 10.5 respectively. In the micro-emulsion of the invention, the surfactant preferably accounts for about 1 to 5% by weight.

The sorbitans used are considered as indirect food additives, and their authorised max. level even low, e.g. 5 g/kg EU Standard, is not reached in ordinary use of the micro-emulsion. Sorbitan 20 is water soluble to a lesser extent (<1% soluble water dispersible)) while sorbitan 80 is oil soluble, and thus should be used only in combination with other surfactants. HLB numbers for Sorbitan 20 and 80 (oil soluble) are 8.6 and 4.3 respectively.

For the formulation of oil-in-water micro-emulsion in accordance with the invention, the following surfactants and surfactant combinations are preferred:

polysorbate 20

Polysorbate 65 in systems at temperature above 45° C.

Combinations polysorbate 20/sorbitan 80

Combinations polysorbate 20/sorbitan 20

Combinations polysorbate 80/sorbitan 20 (micro-emulsion system must be kept at a temperature higher than 40° C. before being spread on the product)

Combinations polysorbate 65/sorbitan 20

Combinations of sorbitan 20 with a relatively large amount of hydrolysed Soybean Lecithin, e.g., at least 1:5 and preferably 1:8.

In a particularly advantageous embodiment of the invention, the surfactants are polysorbate 20 and sorbitan 20 in a ratio from 4:1 to 6:1, preferably 5:1.

The water soluble surfactants form micelles in a determined temperature range and above a specific concentration known as "critical micelle concentration" or CMC. The CMC can be determined for each solution. Examination of the characteristics of the water-surfactant solutions showed that below CMC the solutions have a behavior similar to that of a weak polyelectrolyte, i.e. a slight conductivity contribution in the low-frequency domain (up to 300 MHz), while the high frequency (1 to 18 GHz) response is related to that of water. Above the CMC, a new absorption mechanism appears in the form of a relaxation peak in the range of 1 to 6 GHz, and corresponding to the micellar structure in addition to the free water response at high frequency (6 to 18 GHz), while the low-frequency conductive behavior disappeared completely. The relaxation peak reflects a high absorption and thus shows that the micro-emulsion according to the invention has an increased absorption at the microwave heating frequency of 2.45 Ghz which has the advantages discussed above.

It has been found that a drastic increase of the properties of dielectric absorption and real part of the dielectric permitivity occurs when amino acids are added to the micro-emulsion. A result of the micro-emulsion being spread on the surface of a food product is that additional micro-wave energy will be absorbed at the product surface and the penetration depth of the microwaves is decreased when the product is subjected to micro-wave radiation. Consequently, it is preferred that the oil-in-water micro-emulsion comprises at least one amino acid.

Advantageously, the amino acid is selected from the group consisting of lysine, serine, threonine, glycine, alanine, histidine, valine, leucine, isoleucine, proline, methionine or cysteine. In particular amino acids glycine, L-serine, lysine, and alanin are preferred.

Even though it is perfectly possible to form oil-in-water micro-emulsions using water, a medium-chain-triglyceride and the surfactants according to the invention, it was found that by the addition of small amounts of an emulsifier to the oil phase, the micro-emulsion coexistence domain improved dramatically. Addition of an emulsifier makes the micro-emulsion less sensitive to variations in the composition thereof and to changes in temperature. The addition of an emulsifier to a micro-emulsion makes it more suitable for an industrial environment. Advantageously, the emulsifier is a phospholipid e.g. lecithin. For example hydrolysed lecithin, e.g. soybean has proved useful. In a preferred embodiment of the micro-emulsion there is about 5 to 10% by weight of hydrolysed lecithin in the medium-chain-triglyceride.

Micro-emulsions formed with the above discussed emulsifiers are by far, less sensitive to changes in the composition and in the temperature of the system. It has also been found that the addition of an emulsifier as described above from a dielectric point of view is attractive. It appears that the addition of a slight amount of emulsifier added to the oil phase, e.g., 1 to 15% by weight does not change the physical structure of the system which remains a micro-emulsion of substantially the same characteristics, see FIG. 5.

In another aspect, the invention relates to a process for providing a surface treated food product ready for crisping and/or browning when subjected to micro-wave radiation, comprising the steps of (a) providing a food substrate having at least one surface capable of crisping and/or browning, (b) providing an edible oil-in-water micro-emulsion as discussed above, and (c) coating the edible oil-in-water micro-emulsion onto the surface of the food substrate.

Subsequent to the coating step, the treated food product may be frozen, refrigerated, or kept at ambient temperature. It has been found that even after longer periods in a freezer (e.g., up to 8 weeks at about −25° C.)), the micro-emulsion is effective to provide crisping and/or browning when heated in a microwave oven.

The coating may be introduced by spraying or brushing on to the surface of the food substrate. The amount of coating necessary will vary with the specific type of food product. The coating thickness can vary over a wide range depending upon the desired final crispness or browning of the food product. The optimum amounts can be determined by one of ordinary skill in the art from routine tests. Typically, coating thickness of about 0.02 to about 0.5 mm are useful. In addition, useful amounts of the coating can vary from 0.1 to 4% of the total weight of the food product. For example, for coating of a bread, the amount of coating required corresponds to 1% of the total weight of the final product. However, variation in shape of the food product will vary the amount of micro-emulsion required to provide a desired crispness or browning of the product surface.

EXAMPLES

The following examples are provided to illustrate preferred features of the invention.

Example 1

Dielectric Absorption

FIG. 1 shows the dielectric absorption of a micro-emulsion comprising polysorbat 20. The dielectric absorption, which is the most determining parameter for the micro-wave heating regime of a micro-emulsion based susceptor, is compared with that of water. The higher the dielectric absorption, the larger the heating rate (faster heating) and the lower penetration depth (energy absorbed in the layers of the coated product closest to the surface). At the micro-wave heating frequency (2.45 Ghz), the dielectric absorption of water (1) is about 9 while that of the edible micro-emulsion susceptors (2) is about 44. Considering that the micro-emulsion is made of about 80% or more water on the weight basis (about 94% volume basis), this micro-wave induced crisping effect is clearly associated with the micro-emulsion state.

The real part of the dielectric permittivity, not shown in the diagram, was about 75.

Figure 2:
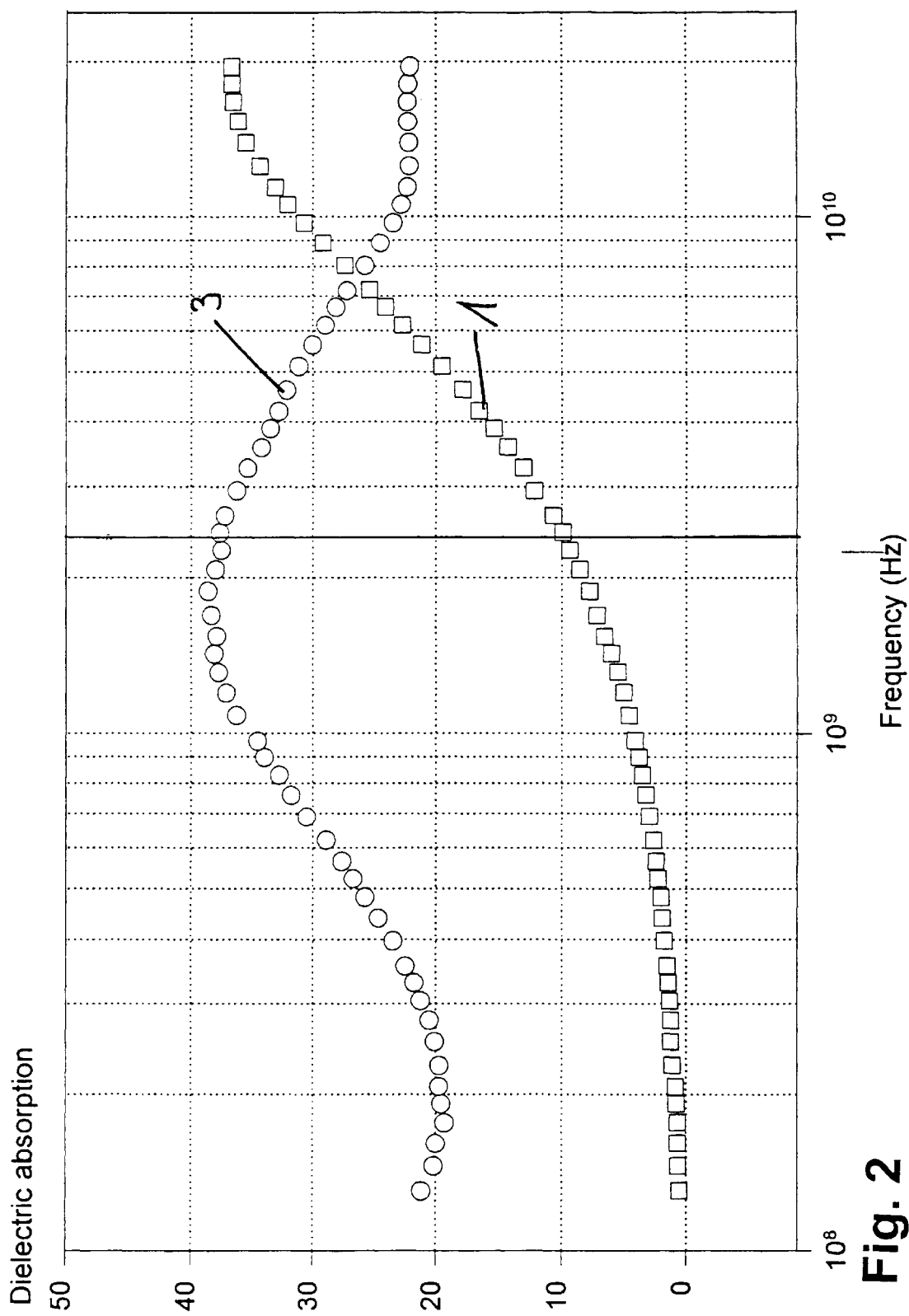
FIG. 2 is a diagram showing the dielectric absorption of the edible susceptor comprising polysorbat 20 and sorbitan 80 compared with the absorption of water.

FIG. 2 shows the dielectric absorption of a micro-emulsion (3) comprising polysorbate 20 and sorbitan 80. At the microwave heating frequency, 2.45 Ghz, the dielectric absorption is 37, and the absorption of water (1) is about 9 as shown in FIG. 1. The high dielectric absorption gives a higher heating rate of the surfaces coated with the micro-emulsion and decreases the penetration depth compared with that of water.

Values measure of the dielectric absorption ($\epsilon''$) and the real part of the permitivity ($\epsilon'$) of the microemulsions made using different surfactants, and at 2.45 Ghz:

|  | $\epsilon''$ | $\epsilon'$ |
| --- | --- | --- |
| PS 20 | 44.3 | 72.5 |
| PS 65 | 29.6 | 65.8 |
| PS 65 /S 20 | 37.3 | 58.6 |
| PS 20 /S 80 | 37.8 | 62.3 |
| PS 20 /S 20 | 35.6 | 65.8 |
| PS 80 /S 20 | 40.3 | 69.7 |
| PS 20 / Hydrol. Lecithin | 33.8 | 65.4 |

PS: Polysorbate, S: Sorbitan

Example 2

Coating of a Bread Roll

Tests were carried out heating bread coated with various micro-emulsions. It was found that with a micro-emulsion having a droplet size of the sprayed droplets of about 300 μm a coating thickness of about 0.1 to 0.2 mm corresponding to 0.6 to 0.8 g of micro-emulsion sprayed on 100 g of bread, gave a crisped and browned surface and a soft heated center when the bread was heated in a micro-wave oven.

Figure 3:
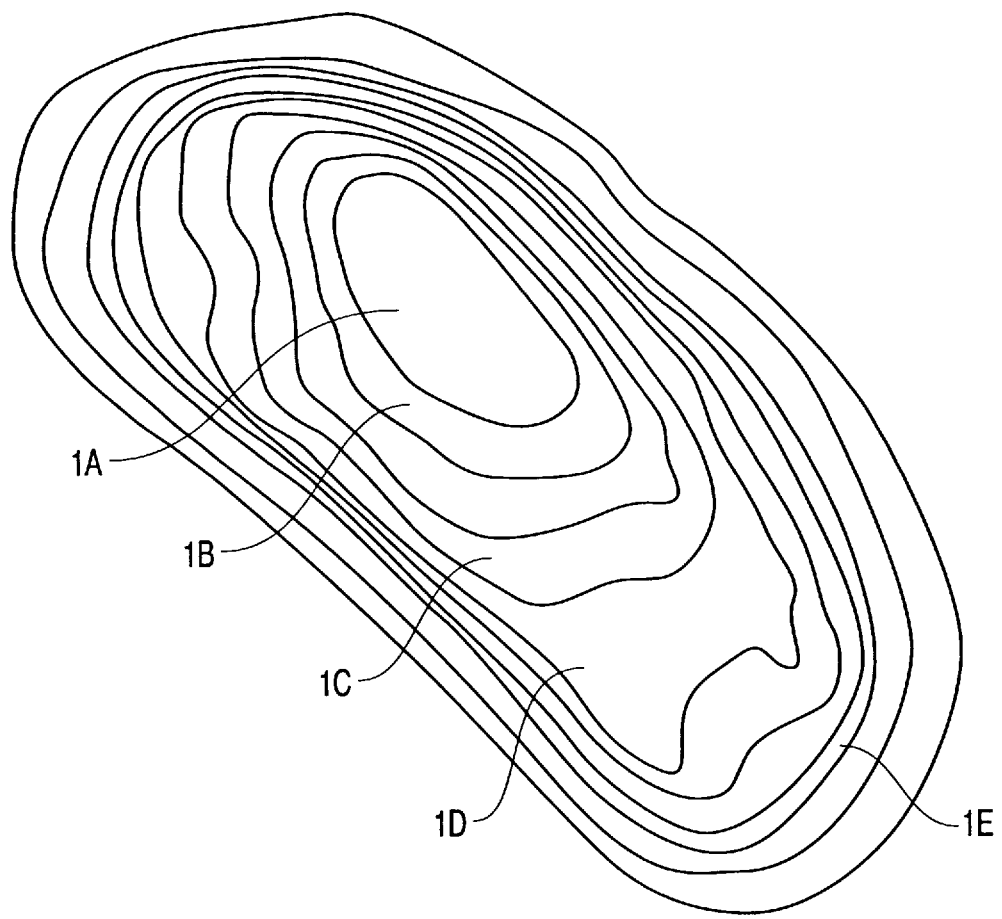
FIG. 3 is a diagram of the heat distribution of an uncoated food product which has been subjected to microwave radiation.
Figure 4:
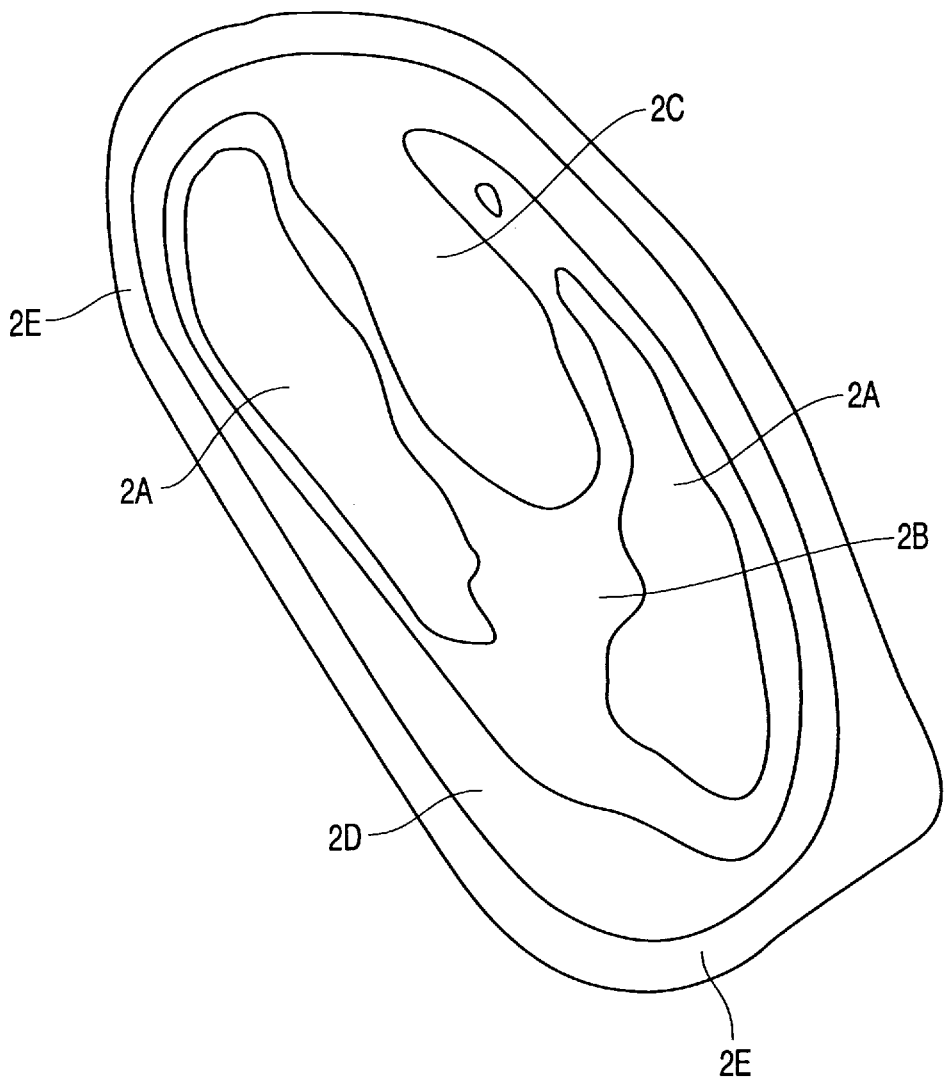
FIG. 4 is a diagram of the heat distribution of a food product coated with the micro-emulsion according to the invention.

FIGS. 3 and 4 show respectively the heat thermograms of a non-coated bread roll and a bread roll coated with a coating according to the invention.

In the experiments the following composition was used:

1.5 moles of Glycine, 0.8 moles of L-serine, and 1 liter water are mixed and consititued the aquas phase, 3.75% medium-chain-triglyceride comprising 5% linoleic acid by weight, 0.4% hydrolysed soybean lecithin by weight, and Polysorbate 20

The micro-emulsion according to the invention was prepared by the steps of adding amino acid to water, adding surfactant to water, adding emulsifier such as lecithin to the oil, and mixing the ingredients with a slight up and down movement to impart micro-emulsification.

In FIGS. 3 and 4, the areas marked correspond to the following temperature variations 1A–1E: approximately 90° C. to 30° C.

2A–2E: approximately 110° C. to 30° C.

FIGS. 3 and 4 show how the micro-emulsion coating changes the heating regime. In FIG. 3 the hottest area 1A is in the center of the bread roll. The disadvantages are as discussed above, an over heating of the center while the outer crust will not be heated sufficiently and will be non crispy due to the condensing of moisture at the outer surface of the bread roll. In FIG. 4, the micro-wave focusing effect is avoided. The hottest area 2A is shifted from the center and to the surface of the roll.

It will be appreciated that when generating a thermogram it is not possible to obtain a true measurement of the actual heat distribution obtained in the microwave-oven. During the time it takes to divide the bread roll and make the measurement, the outer part of it will have been cooled and thus the hottest area is no longer the surface of the product just below the surface 2E, but 2A such as can bee seen from FIG. 4.

It is thus possible to control the temperature of the interior of the product through controlling the dielectric properties of the micro-emulsion. FIG. 4 also shows that the micro-emulsion coating reduces the microwave penetration depth and that the product is heated to a higher temperature at a thin layer just beneath the surface of the product.

Taste tests were carried out in order to evaluate whether any off-taste from the micro-emulsion coating was detectable. No off-taste was detectable from the micro-emulsion and in-particular, no flavors were released resulting therefrom, other than those originating from the crisping and browning of the product.

Figure 5:
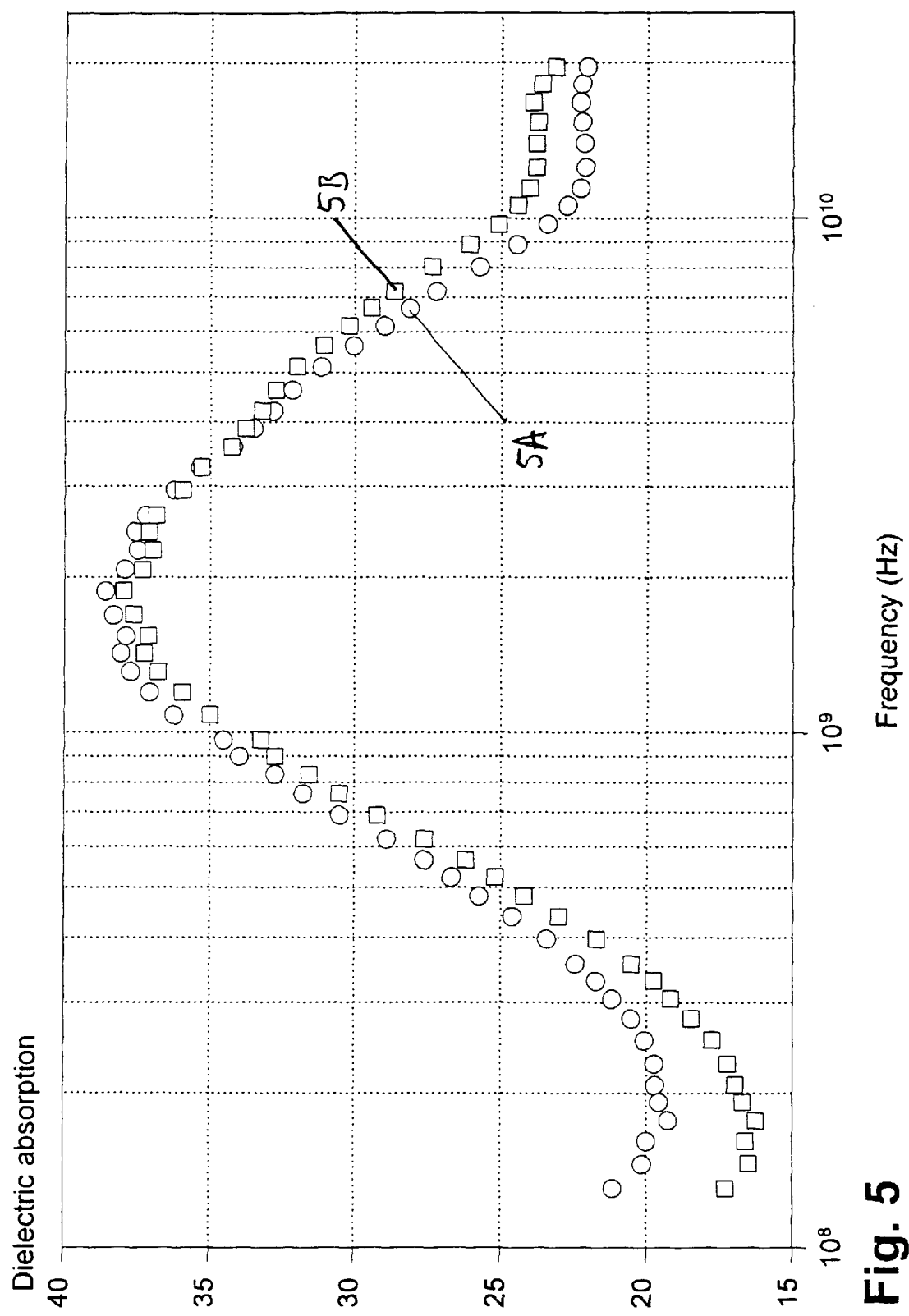
FIG. 5 is a diagram showing the dielectric absorption of an edible micro-emulsion comprising a lecithin compared with micro-emulsion without lecithin.

FIG. 5 shows a diagram of the dielectric absorption of an edible micro-emulsion comprising lecithin compared with micro-emulsion without lecithin. The emulsifier added to the micro-emulsion is hydrolysed lecithin.

As discussed above, addition of an emulsifier to the micro-emulsions makes the emulsion less sensitive to changes in the composition and in the temperature of the system. In FIGS. 5, 5A and 5B are respectively illustrating the dielectric absorption of the micro-emulsion without and with an emulsifier. As will appear from the diagram, the addition of an amount of emulsifier (preferably when added to the oil phase) does not change the absorption curve shape of the dielectric response indicating thus that the micro-emulsion has not changed.

What is claimed is:

1. An edible oil-in-water micro-emulsion for the crisping and browning of a food product when subjected to microwave radiation comprising:
   (a) an aqueous phase comprising at least 80% water by weight of the micro-emulsion:
   (b) an oil having an interfacial tension against water below 0.10 N/m in an amount sufficient to provide an oil chase but less than 10% by weight of the micro-emulsion; and
   (c) at least one non-ionic hydrophilic surfactant in an amount sufficient to form interfacial layers between the oil and water to form the micro-emulsion.

2. Edible oil-in-water micro-emulsion according to claim 1, wherein the interfacial tension against water is below 0.0250 N/m.

3. Edible oil-in-water micro-emulsion according to claim 1, wherein the oil is present in an amount of 1 to less than 10% by weight.

4. Edible oil-in-water micro-emulsion according to claim 1, wherein the oil is present in an amount of 4 to 8% and comprises a medium-chain triglyceride comprising C6–C18 fatty acids.

5. Edible oil-in-water micro-emulsion according to claim 4, wherein the triglyceride comprises C8–C12 fatty acids and the interfacial tension against water is in the range of 0.019 to 0.006 N/m.

6. Edible oil-in-water micro-emulsion according to claim 4, wherein the medium-chain triglyceride comprises fractionated C8–C10 coconut fatty acids.

7. Edible oil-in-water micro-emulsion according to claim 4, wherein the medium-chain triglyceride is composed of about 60% of C8 and 40% of C10 fatty acids.

8. Edible oil-in-water micro-emulsion according to claim 4, wherein the oil includes 1 to 10% of an edible organic acid.

9. Edible oil-in-water micro-emulsion according to claim 1, wherein the nonionic hydrophilic surfactant has a hydrophile-lipophile balance in the range of 8 to 18.

10. Edible oil-in-water micro-emulsion according to claim 9, wherein the hydrophile-lipophile balance is in the range of 13 to 18, and the oil includes 1 to 10% of linoleic acid.

11. Edible oil-in-water micro-emulsion according to claim 1, wherein the surfactant is selected from the group consisting of a polysorbate and a sorbitan or a combination thereof.

12. Edible oil-in-water micro-emulsion according to claim 11, wherein the polysorbate is selected from the group consisting of polysorbate 20, polysorbate 65 and polysorbate 80 or a combination thereof.

13. Edible oil-in-water micro-emulsion according to claim 11, wherein the sorbitan is selected from the group consisting of sorbitan 20, sorbitan 80 or a combination thereof.

14. Edible oil-in-water micro-emulsion according to claim 13, wherein the surfactant is a combination of surfactants of polysorbate 20 and sorbitan 20 in a ratio from 4:1 to 6:1.

15. Edible oil-in-water micro-emulsion according to claim 1 further comprising at least one amino acid in an amount sufficient to increase absorption of microwave radiation.

16. Edible oil-in-water micro-emulsion according to claim 15, wherein the amino acid is selected from the group consisting of lysine, serine, threonine, glycine, alanine, valine, leucine, isoleucine, proline, methionine, histidine or cysteine.

17. Edible oil-in-water micro-emulsion according to claim 1, further comprising an emulsifier added to the oil phase in an amount sufficient to enhance the temperature stability of the micro-emulsion.

18. Edible oil-in-water micro-emulsion according to claim 17, wherein the emulsifier is a phospholipid and is present in an amount of about 1 to 15% by weight.

19. Edible oil-in-water micro-emulsion according to claim 18, wherein the emulsifier is lecithin and is present in an amount of about 5 to 10% by weight.

20. Edible oil-in-water micro-emulsion according to claim 19, wherein the lecithin is a hydrolysed soybean lecithin.

21. Edible oil-in-water micro-emulsion according to claim 20, wherein about 10% of the oil phase is lecithin.

22. A process for providing a surface treated food product ready for crisping and/or browning when subjected to microwave radiation, comprising the steps of (a) providing a food substrate having at least one surface capable of crisping and/or browning, (b) providing an edible oil-in-water micro-emulsion according to claim 1, (c) coating the edible oil-in-water micro-emulsion onto at least a portion of the surface of the food substrate in an amount sufficient to provide crispness or browning when the food substrate is exposed to microwave radiation.

23. A process according to claim 22, comprising the step of freezing or refrigerating the coated food substrate.

24. A process according to claim 22 wherein the entire surface of the food product is coated by the micro-emulsion in an amount of between about 0.1 to 4% by weight of the food product.

25. A process according to claim 22 wherein the entire surface of the food product is coated by the micro-emulsion at a thickness of between about 0.02 to 0.5 mm.

* * * * *

UNITED STATES PATENT AND TRADEMARK OFFICE
CERTIFICATE OF CORRECTION

PATENT NO. : 5,891,490

DATED : April 6, 1999

INVENTOR(S) : Mustapha Merabet

It is certified that error appears in the above-identified patent and that said Letters Patent is hereby corrected as shown below:

Column 8, line 46 (claim 1, line 5): change "micro-emulsion:" to --micro-emulsion;--.

Column 8, line 59 (claim 1, line 8): change "chase" to --phase--.

Signed and Sealed this

Twentieth Day of July, 1999

Q. TODD DICKINSON

Attest:

Attesting Officer

Acting Commissioner of Patents and Trademarks